Patented Nov. 4, 1930

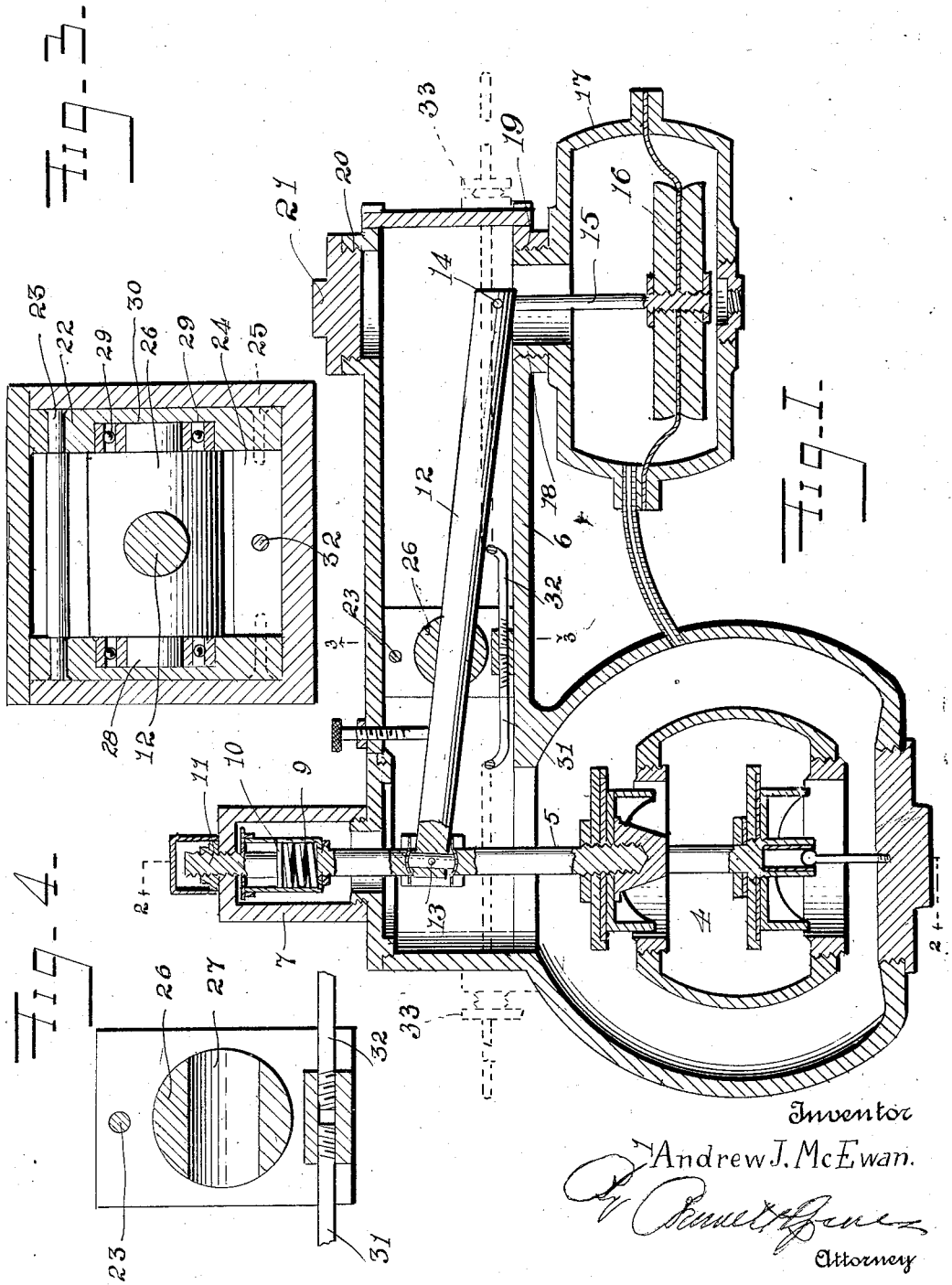

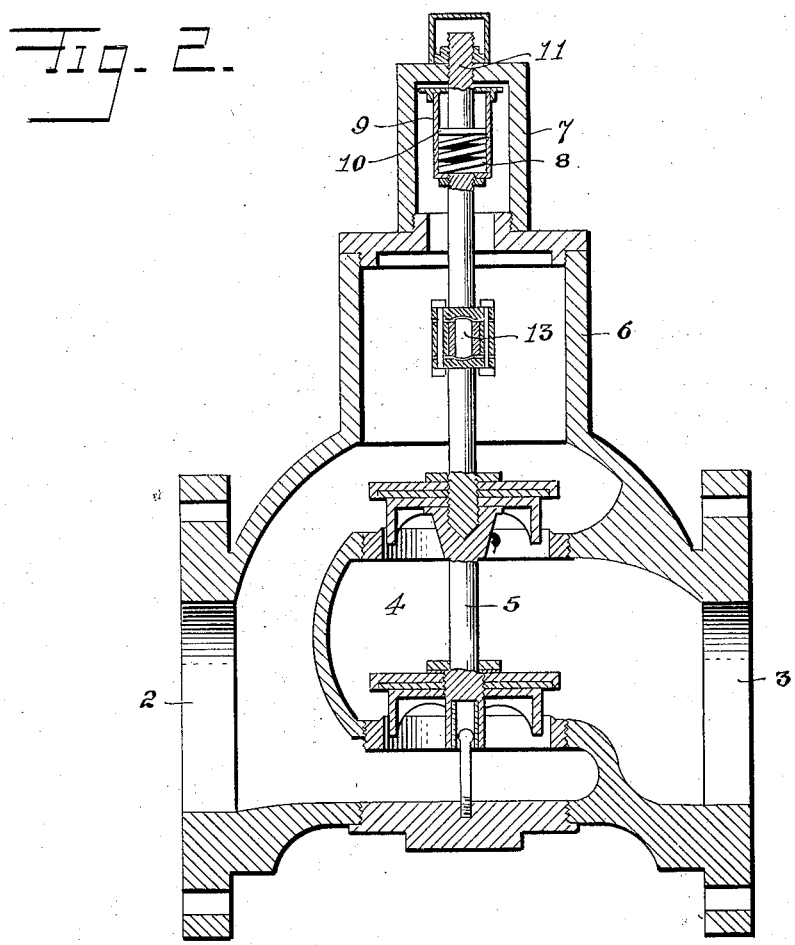

1,780,713

UNITED STATES PATENT OFFICE

ANDREW J. McEWAN, OF TULSA, OKLAHOMA

CONTROL OR POWER LEVER MECHANISM

Application filed September 30, 1926. Serial No. 138,782.

This invention relates to control or power lever mechanisms wherein a pivoted lever is employed for transmitting variable power or variably controlling or governing applied powers through a shifting of the fulcrum point of an intermediately pivoted lever to change the relative power ratios of its oppositely extending ends or arms.

One object of the invention is to provide a lever mechanism with a shifting fulcrum of novel construction, whereby the lever is pivotally supported for a free and easy pivotal movement while permitting of the shifting of the fulcrum to different positions longitudinally of the lever.

Another object of the invention is to provide a lever mechanism which is enclosed and protected from injury and in which a shifting of the fulcrum may be readily and conveniently effected from the exterior of the enclosure.

Still another object of the invention is to provide a shiftable fulcrum which may be arranged so as to be guided in an enclosure and which is of open construction so as to permit flow of fluids or liquids through the fulcrum from side to side thereof.

Still another object of the invention is to provide a roller bearing shifting fulcrum which allows free sliding and pivotal movements of the lever to adapt the lever to swing freely in its controlling or power transmitting movements while also adapting the lever to shift longitudinally to compensate for angularities of movements between its arms and parts operatively coupled thereto.

While the invention is adapted for general use in mechanisms of various kinds employing a lever whose powers are to be varied, I have in the accompanying drawing, for purpose of exemplification, shown its application to a fluid pressure regulator, in which drawing,—

Figure 1 is a vertical longitudinal section through a fluid pressure regulating valve, showing the embodiment of the invention therein.

Figure 2 is a section on line 2—2 of Figure 1 on a reduced scale.

Figure 3 is a vertical transverse section on line 3—3 of Figure 1 on an enlarged scale.

Figure 4 is a vertical longitudinal section through the shifting fulcrum per se on a larger scale than that shown in Figure 1.

In the constructional example shown, wherein I have shown the fulcrum employed in connection with the valve controlled or operating lever for the valve member of a fluid pressure regulating valve, 1 designates a valve casing having ports 2 and 3, and a valve 4 controlling communication between said ports, said valve having its stem 5 projecting upwardly into a valve lever casing 6 and into a bonnet 7 connected therewith. A spring 8 is provided which is enclosed in a guide cage or cylinder 9 carried by the stem and is adapted to bear upon the flange or head 10 of a stem 11, said stem and head forming a stationary abutment and tensioning device for the spring. The spring may be disposed between the abutment 10 and lower end of the cage 9 for a valve closing action or it may be disposed between the top of the cage and the abutment 10 for a valve opening action.

In the casing 6 is disposed a control lever 12 pivotally connected at its inner end, as at 13, to the valve stem 5. The opposite or outer end of the lever 12 is pivotally connected, as at 14, to the stem 15 of a weighted flexible diaphragm 16 in a diaphragm chamber 17. At one side the diaphragm chamber is provided with an opening bounded by a flange 18 which is adapted for threaded engagement with an opening 19 in the bottom of the casing 6, as shown, or with an opening 20 in the top of the casing. The diaphragm is thus coupled to the lever so as to be influenced by fluid pressure under certain conditions, for opposing a working force on the lever in opposition to the force of the spring. When the spring 8 is arranged as shown in Figure 1 for a valve closing action, the diaphragm chamber 17 is connected with opening 19 so that the diaphragm 16, under the force of fluid pressure acting upon its upper face, will transmit opening movement to the valve 4 against the pressure of the spring 8. When the spring 8 is disposed between the abutment 10 and upper end of the cage 9 for a valve lifting or opening action, the diaphragm chamber may be reversed and engaged with opening 20 and the stem 15 engaged with the lever 12 in this reversed position of the diaphragm, so that with such arrangement of the parts the diaphragm 16 will be operated by fluid pressure upon its inner face to close the valve against the opening pressure of spring 8. A plug 21 is provided for closing either opening 19 or 20 when the diaphragm chamber is disconnected therefrom.

The lever 12 is pivotally supported intermediate of its ends by a shifting fulcrum embodying my invention. This shifting fulcrum comprises a fulcrum block or frame consisting of side plates 22 suitably connected at their upper ends and held in spaced relation by a bolt or rivet 23 and suitably connected and held in spaced relation at their lower ends by a bottom plate 24 secured to the side plates by screws or other suitable fastenings 25. The plug or frame, as shown, is of rectangular formation to conform to that of the casing 6, and is fitted for an accurate guide motion therein without the use of supplemental guiding means. Disposed between the two side plates 22 is a bearing roller 26 having an opening 27 through which the lever 12 extends and through which the lever is slidably movable to compensate for variations in angularities of motion between its ends and the valve stem 5 and diaphragm stem 15 coupled thereto. This roller is provided at its ends with trunnions 28 journaled in anti-friction roller or ball bearings 29 set in recesses 30 in the side plates 22, thus adapting the roller and lever to have free and easy pivotal movements. The roller 26 is disposed between the parts 23 and 24 and is spaced therefrom so as to allow the lever 12 to have proper swing without interference, and so as to provide an open frame fulcrum which will permit of the free flow of fluid under pressure throughout the casing 6.

By adjustment of the shifting fulcrum in the casing 6 it will be understood that the length of the lever arms projecting beyond opposite sides of the fulcrum and coupled to the valve and diaphragm, respectively, may be varied so as to vary their power ratios, thus providing for such a change in ratios, in connection with variations in the tension of spring 8, as may be necessary to secure a desired sensitiveness of valve action, or a determined valve action under different pressures. The lever and its fulcrum are enclosed within the casing 6 and thus protected from access of dust and dirt and liability of casual derangement or injury. Suitable means may be provided for adjusting the shifting fulcrum from the exterior of the casing. In the present instance rods 31 and 32 are shown which are connected at their inner ends with the bottom plate 24 and extend outwardly at the opposite ends of the casing 6 through stuffing-boxes 33. The exteriorly projecting ends of these rods serve as handles or finger-pieces whereby the fulcrum block may be shifted from either end of the casing as may be found most convenient in service. If desired, however, either one of these rods may be dispensed with and a single adjusting rod employed.

From the foregoing description, taken in connection with the drawing, the construction and operation of my improved power or control mechanism will be readily understood and it will be seen that my invention provides a power or control lever and novel shifting fulcrum therefor whereby the power ratios of the lever arms may be varied within wide limits. Also it will be seen that the construction described provides for the enclosure and protection of the parts against injury and the adjustment of the fulcrum as required from the exterior of the casing without the necessity of removing any parts. While my invention is shown and described as applied to a fluid pressure regulator, it is, of course, adapted for many and varied purposes, wherever a power or control action is desired. I therefore do not limit the invention in its application to any particular organization, except when so restricted by the appended claims.

Having thus fully described my invention, I claim:—

1. In a power mechanism, a casing of restricted cross-sectional dimensions, a fulcrum block of the same cross-sectional shape as the casing and slidably engaging the walls thereof, a roller carried by said fulcrum block, a lever pivotally mounted by said roller on the block and shiftable longitudinally through the block, counteracting force applying devices acting upon the opposite ends of the lever, and means connected with the block and extending to the exterior of the casing whereby the block may be adjusted to vary the fulcrum point of the lever and the force applying ratios of the force applying devices acting on the ends thereof.

2. In a power mechanism, a casing of restricted cross-sectional dimensions, a fulcrum block disposed within and in positive guided connection with the casing, a roller carried by said fulcrum block, a lever pivotally mounted by said roller on the block and shiftable longitudinally through the block, counteracting force applying devices acting upon the opposite ends of the lever, and means connected with the block and extending to the exterior of the casing whereby said block may be slidably shifted in the casing.

In testimony whereof I affix my signature.

ANDREW J. McEWAN.